United States Patent [19]
Glausch et al.

[11] Patent Number: 5,735,939
[45] Date of Patent: Apr. 7, 1998

[54] PIGMENT PREPARATION FOR ANTI-CORROSION COATING MATERIAL

[75] Inventors: Ralf Glausch, Darmstadt; Georg Reinhard, Dresden; Renate Jircik, Dresden; Ursula Rammelt, Dresden, all of Germany

[73] Assignee: Merck Patent Gesellschaft MIT Beschrankter Haftung, Darmstadt, Germany

[21] Appl. No.: 414,235

[22] Filed: Mar. 31, 1995

[30] Foreign Application Priority Data

Apr. 2, 1994 [DE] Germany .......... 44 11 568.7

[51] Int. Cl.$^6$ .......................................... C04B 9/02
[52] U.S. Cl. .................. 106/14.44; 106/14.05; 106/14.34; 106/14.37; 106/14.38; 106/143.39; 106/14.41; 106/14.42; 106/14.43; 106/410; 106/411; 106/415; 106/417; 106/427; 106/462; 106/466; 106/470; 428/457
[58] Field of Search .................. 106/410, 411, 106/415, 417, 427, 462, 470, 14.05, 14.41, 14.42, 14.43, 14.44, 14.34, 14.37, 14.38, 14.39, 466; 428/457

[56] References Cited

U.S. PATENT DOCUMENTS

| 4,581,395 | 4/1986 | Nakaya et al. ............... 523/410 |
| 5,330,850 | 7/1994 | Suzuki et al. ............... 428/623 |
| 5,439,957 | 8/1995 | Takimoto et al. ............ 106/14.14 |

FOREIGN PATENT DOCUMENTS

| 281417 | 8/1990 | Germany . |
| 90/13605 | 11/1990 | WIPO . |

OTHER PUBLICATIONS

"Kirk–Othmer Encyclopedia Technology", v. 17, p. 813, Wiley & Sons, NY, Dec. 1982.
Derwent abstract AN 91–007866 of DD 281427, Aug. 1990.

*Primary Examiner*—Mark L. Bell
*Assistant Examiner*—Scott L. Hertzog
*Attorney, Agent, or Firm*—Millen, White, Zelano & Branigan, P.C.

[57] ABSTRACT

A pigment preparation for anti-corrosion coating materials, comprising (i) 3–40% by weight of a monomeric or polymeric, metal-free or metal-containing chelate-forming compound, preferably a phthalocyanine, (ii) 3–40% by weight of a material in flake form, preferably mica, and (iii) 25–80% by weight of a hydroxide ion-binding material, preferably a metaphosphate, di- or triphosphate. In a further embodiment, the pigment preparation additionally contains 5–65% by weight of a conductive pigment.

17 Claims, No Drawings

PIGMENT PREPARATION FOR ANTI-CORROSION COATING MATERIAL

The invention relates to lead-free and chromate-free pigment preparations for the preparation of anti-corrosion coating materials.

BACKGROUND OF THE INVENTION

Metallic articles can be protected against corrosion by coating them with a metallic, inorganic or organic-protective coat. Organic protective coats in particular are provided, in order to increase their corrosion prevention capacity, with special pigments and/or fillers. These include red lead oxide, zinc chromate, zinc phosphate, talc, graphite and mica. In addition, however, organic compounds are used as anti-corrosive pigments on their own or in combination with inorganic pigments and fillers. Examples of such organic compounds are benzidine phosphate, benzidine molybdate, benzidine-hexacyanoferrate, organic phosphonic and arsenic acids and aromatic and aliphatic carboxylic acids and their salts, such as benzoates and laurates.

In addition, DD 281 427 discloses monomeric and polymeric chelate-forming compounds, for example metal-free or metal-containing tetraarylporphyrin or tetraazaannulene, as corrosion-reducing substances for the protection of metallic surfaces.

Because of their toxic or carcinogenic properties, the highly effective lead and chromate pigments can no longer be employed for corrosion prevention. The pigments which have previously been used in their place, zinc phosphate and zinc tetraborate, are only of a comparatively low efficiency.

Zinc salts initially require the substrate to corrode, for example in the case of iron:

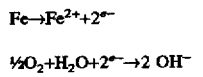

$$\tfrac{1}{2}O_2 + H_2O + 2e^- \rightarrow 2\ OH^-$$

and are then intended to form basic, relatively insoluble complexes with the OH⁻ ions formed. These complexes are intended either to adhere firmly to the substrate surface or to precipitate in defects in a corrosion-preventive primer coat and to block these defects. This presupposes, on the one hand, that the corresponding zinc salt is present in a sufficient pigment volume concentration and has not been washed out in the interim period because of its solubility in water and, on the other hand, that no other complex-forming species are present in the coating or in the adjacent corrosive medium. These are the reasons why zinc salt pigments often fail, or are markedly inferior in their action to the classical active pigments, red lead oxide and zinc chromate.

There is therefore a need for lead-free and chromate-free pigments or pigment preparations which can be used for primer coats on metals which are susceptible to corrosion, and which develop a corrosion-preventive action which is equivalent to the protective effect of lead pigments and chromate pigments.

SUMMARY OF THE INVENTION

An object of the invention is to provide a pigment preparation which can be incorporated into coating formulations based on conventional binders and which, as a primer on a wide variety of metal substrates, especially on the surfaces of ferrous materials, possesses anti-corrosion properties which are comparable with the protective action of lead pigments and chromate pigments. This pigment preparation should possess pronounced anti-corrosion properties not only under atmospheric exposure but also in aerated aqueous media.

Upon further study of the specification and appended claims, further objects and advantages of this invention will become apparent to those skilled in the art.

The present invention is accordingly directed to a pigment preparation comprising:

(i) preferably about 3–40% by mass (i.e., by weight) of a monomeric and/or polymeric, metal-free or metal-containing chelate complex compound of the general formulae I or II

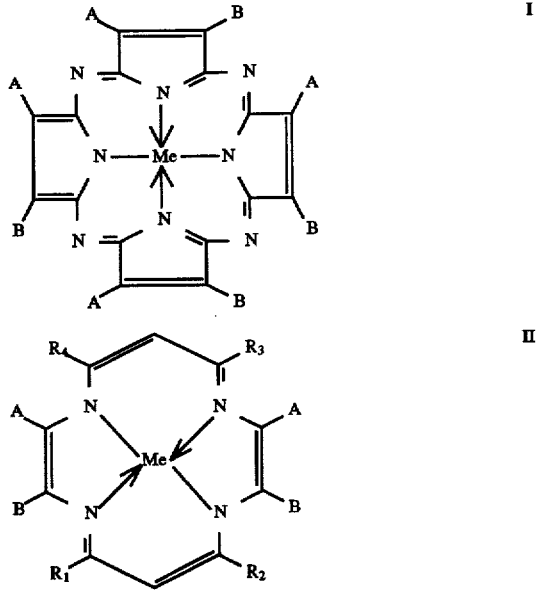

in which

A and B are each independently of the other an aromatic or cycloaliphatic radical which may also optionally contain heteroatoms, such as S, Se, O and N, and aryl, alkyl, halogen, oxygen-, sulphur- or nitrogen-containing groups as additional substituents, $R^1$, $R^2$, $R^3$ and $R^4$ are independently H atoms or alkyl radicals and Me is Fe, Ni, Co, Mn, Bi, Sn, Zn or $H_2$, (ii) preferably about 3–40% by mass of a material in flake form and (iii) preferably about 25–80% by mass of a material which binds hydroxide ions.

In a further embodiment the pigment preparation according to the invention additionally contains preferably about 5–65% by mass of a conductive pigment.

The individual components in the pigment preparations according to the invention in each case add up to give 100%.

The chelate complex compounds (i) employed are the above-mentioned compounds characterized by the general formulae I and II, preferably phthalocyanines, tetraarylporphyrines and tetraazaannulenes. Among the phthalocyanines, metal phthalocyanines and, in particular, iron phthalocyanine are preferred.

The problem of the high production costs of metal phthalocyanine can be countered by applying this active component to conductive support materials, such as surface-modified mica and/or graphite, and thereby achieving an identical or even greater anti-corrosion effect with far less of the actual active substance, metal phthalocyanine.

In the formulae I and II, A and B are each independently an aromatic, particularly carbocyclic aromatic, or cycloaliphatic radical, preferably of 3 to 10 carbon atoms, which optionally contains in the ring heteroatoms, preferably 1 to 3 such heteroatoms in non-adjacent positions, such as S, Se, O and N, and which may also optionally be independently substituted by 1–3 aryl, preferably of 6–10 carbon atoms, alkyl, preferably of 1–20 carbon atoms, halogen or oxygen-, sulfur- or nitrogen-containing compounds, such as hydroxy, alkoxy, thiol, thioether, amino or nitro. Also, $R^1$–$R^4$ are independently hydrogen or alkyl, preferably of 1–20 carbon atoms. The polymeric chelate complexes have units of the formula I or II linked through the A or B groups, such A or B linking groups are multivalent, aromatic, cycloaliphatic or alkyl linking groups, preferably divalent phenyl, biphenyl, naphthyl or alkyl groups, alkyl being preferably of more than 3 carbon atoms. The number of units of formula I or II for the polymer is preferably 2–10, particularly 10–12, or particularly tetramers.

The chelate complex compounds are present in the pigment preparation according to the invention in a proportion of preferably about 3–40%, more preferably about 3 to 25% by weight, still more preferably from about 15 to 25% by weight. The chelate complex compounds reduce oxygen which, dissolved in water, penetrates via pore passages and defects in the coating down to the metal substrate, and thus they passivate the exposed metal substrate. At the same time the reduction of the oxygen gives rise to hydroxide ions:

$$O_2 + 2 H_2O + 4 e^- \rightarrow 4 OH^-.$$

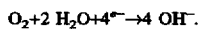

These hydroxide ions are bound by a component (iii) of the pigment preparation according to the invention.

The material in flake form (ii) may be, for example, of natural or synthetic mica and other phyllosilicates, such as talc, kaolin and sericite, or alternatively glass platelets.

Preferred materials in flake form are mica and other flake-form pigments which are prepared in accordance with International Application PCT/EP92/02 351. They consist of a transparent, inorganic matrix in platelet form, preferably of silicon dioxide. The matrix is prepared by solidifying a liquid precursor on a continuous belt. Additional substances may also be incorporated into this matrix.

The materials in flake form typically have a thickness of from about 0.05 to 5 μm and, in particular, from about 0.2 to 2 μm. The extent in the two other dimensions is from about 1 to 250 μm and, in particular, from about 5 to 60 μm. The ratio of the extent in the principal dimension to the thickness (aspect ratio) is preferably more than 3, and more preferably more than 5.

When mixed with the material in flake form, the individual constituents of the pigment preparation according to the invention, in coating materials, adopt a uniform orientation encapsulated by the film former, e.g., the polymer contained in the lacquer as a main component, and lead to coatings having a high barrier effect with respect to the transport of the corrosive aqueous medium to the metal surface and for the transport to the exterior of the corrosion products which are then formed at that surface.

The preferred materials (iii) employed in accordance with the invention as hydroxide ion binders are metaphosphates, di- and triphosphates, silica gels, silicates, aluminosilicates, calcite and all relatively insoluble metal salts which form relatively insoluble basic salts or complex compounds with $OH^-$ ions. For example, $Ca_3(OH)_2[Si_4O_{10}]$ is formed by the incorporation of hydroxide ions into $Ca[SiO_3]$.

Other compounds which can be used are those which form at their surface a buffer system which fixes the pH of the adjacent, aqueous medium, in the range $6 \leq pH \leq 8.5$, and which are non-hazardous for the delamination of organic coatings on steel substrates, for example:

$$R-COO^- + H_2O \rightleftharpoons R-COOH + OH^-,$$

wherein R is alkyl or aryl. Preference is given to the use of calcium metaphosphate, as the material which binds the hydroxide ions formed in the reduction of oxygen by the chelate complex.

The hydroxide ion-binding material is present in the pigment preparation according to the invention in a proportion of from preferably about 25 to 80% by mass, more preferably from about 40 to 60% by mass.

In a further embodiment, the pigment preparation according to the invention additionally contains preferably from about 5 to 65% by mass, more preferably from about 15 to 55% by mass, of a conductive pigment. The conductive pigment either consists of a support material which is coated with a conductive layer, or the pigment is formed by the conductive material alone, as is the case, for example, for carbon black or graphite. Suitable support materials are mica, barium sulfate, silicon dioxide or titanium dioxide. Suitable conductive layers are anti-mony-doped tin oxide, halogen-doped tin oxide or aluminum-doped zinc oxide. These conductive materials may also form the pigment alone. One example of a commercially available conductive pigment is Minatec®CM 30 from E. Merck, Darmstadt. This is a titanium dioxide-coated mica which is covered with a layer of antimony-doped tin oxide.

The conductive pigment gives a better guarantee of the ability of the pigment preparation according to the invention to conduct electrons, which is necessary for the catalyzed reduction of oxygen.

The binding of the hydroxide ions formed in the reduction of oxygen prevents a delamination of the coating from the metal substrate, so that no underfilm corrosion occurs, for example, under-rusting in the case of ferrous materials.

The pigment preparation according to the invention is prepared from the individual components using the machinery customary in the pigment and coatings industry, for example sand or bead mills, ball mills and roll mills, in the degree of milling fineness required in practice, and is dispersed in coating formulations based on conventional binders. It is, however, also possible to disperse the individual components in succession in the binder. Binders of this type, for example, are alkyd resins, polyurethanes, chlorinated rubber or melamine resins, which are present in the coating formulations in a quantity of from 35 to 55% by mass.

Other constituents, in a quantity of up to about 2% by mass, are siccatives and auxiliaries such as, for example, dispersing agents, levelling agents, antisettling agents, adhesives or thixotropic agents. Also present, in a proportion of from 10 to 20% by mass, are solvents which must be matched by those skilled in the art to the respective binder. Conventional solvents include butyl acetate, xylene and paraffinic hydrocarbon mixtures in the boiling range from 120° to 180° C.

The pigment preparation according to the invention is employed for coating formulations which are applied as a primer to a wide variety of metal substrates, especially to surfaces of ferrous materials. The primer is notable, once film formation is complete, for outstanding anti-corrosion properties under atmospheric exposure or exposure in aerated aqueous media.

The pigment preparation according to the invention meets all of the requirements placed on pigments for anti-corrosion primers.

It impairs neither the flow properties nor the film-forming properties of the coating material, but, instead leads to a uniform layer which adheres firmly to metal substrates, and is particularly resistant to ageing and has a high barrier effect. In addition, it does not restrict the capacity of the primer layer produced to be coated over for the build-up of multicoat systems and, in particular, is able to passivate the metal substrate in pores or in defects which have formed in a coating because of mechanical effects, under the action of aqueous media, and thereby is able to prevent underfilm corrosion, for example, under-rusting in the case of ferrous materials.

A further advantage of the pigment preparations according to the invention is that they can also be used in coating formulations which contain zinc phosphate, and the primers prepared therewith are markedly superior in their anti-corrosion properties even to those pigmented with zinc chromate.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German application No. P 44 11 568.7, filed Apr. 2, 1994 is hereby incorporated by reference.

EXAMPLES

Pigment preparations according to the invention are incorporated into binder systems using mixing and dispersing methods conventional in the paint industry, at particle sizes of preferably below 20 about μm. The coating materials containing the pigment preparations according to the invention achieve the viscosity required for processing by means of the diluents appropriate to the respective binders. These diluents, which are conventionally butyl acetate, xylene and paraffinic hydrocarbons in the boiling range from 120° to 180° C., can be taken by the person skilled in the art from the Lackrohstofftabellen [Paint Raw Materials Tables] of Rarsten, published by Vincentz-Verlag. Five coating materials according to the invention and described below in Examples 1-5 are prepared in this way, and are used to coat test panels consisting of an ordinary steel grade. These test panels are subjected to the following tests, under simultaneous comparison with two reference systems, a zinc phosphate-containing coating material and one containing zinc chromate described below as Comparative Examples 1 and 2:

a) Outdoor weathering according to DIN 53166 b) MACHU test, alternating exposure after 8 h immersion in a solution of 50 g of NaCl, 10 ml of glacial acetic acid, 5 g of 30% hydrogen peroxide solution per liter of distilled water (fresh daily) at 40° C. and 16 h exposure to dry air at room temperature per cycle.

c) Alternating climatic test in accordance with VDA 621-415.

Results of the anti-corrosion tests a) Outdoor weathering according to DIN 53166 After an outdoor storage time of 12 months, the slit made in the samples coated using reference system I or II is surrounded over an area 2 to 3 mm wide by a dense array of small blisters, whereas, for all the coatings made using the pigment combinations according to the invention, no blistering has yet occurred.

b) MACHU test (8 cycles) The parameters assessed were the degree of blistering of the coatings according to DIN 53209 and the corroded surface as a proportion of the total surface area after the coating had undergone 8 exposure cycles:

| Coating | Degree of Blistering | Proportion of surface corroded, in % |
|---|---|---|
| Reference system I | m³/g³ | 42 |
| Reference system II | m⁴/g⁴ | 60 |
| Example 1 | 0/0 | <1 |
| Example 2 | 0/0 | <1 |
| Example 3 | m¹/g¹ | <1 |
| Example 4 | 0/0 | <1 |
| Example 5 | m¹/g¹ | approx. 1 | c) Alternating climatic test in accordance with VDA 621-415 After 9 cycles of alternating climatic exposure the reference systems exhibit under-rusting at the slit which at some points has reached up to 3 mm, whereas this process on the samples according to the invention cannot yet be unambiguously ascertained (<1 mm).

The results indicate that the protective coatings produced with the pigment preparations according to the invention, on ferrous material surfaces in comparison with the reference systems, provide a distinctly better protection against corrosion, even though reference system II contains a highly effective chromate pigment.

EXAMPLE 1

| Iron phthalocyanine | 6.3 | % by mass |
|---|---|---|
| Minatec 30 CM | 6.3 | % by mass |
| Mica | 3.1 | % by mass |
| Ca m-phosphate | 12.6 | % by mass |
| Zinc phosphate (hopeite) | 6.3 | % by mass |
| Resin solution, 60% in xylene (air-drying and heat-drying short-oil alkyd resin) | 48.8 | % by mass |
| Solvent | 15.1 | % by mass |
| Siccatives and auxiliaries | 1.5 | % by mass |

EXAMPLE 2

| Iron phthalocyanine | 4.4 | % by mass |
|---|---|---|
| Mica | 4.4 | % by mass |
| Ca m-phosphate | 17.5 | % by mass |
| Zn m-phosphate | 8.7 | % by mass |
| Resin solution, 60% in xylene (air-drying and heat-drying short-oil alkyd resin) | 48.7 | % by mass |
| Solvent | 14.6 | % by mass |
| Siccatives and auxiliaries | 1.7 | % by mass |

EXAMPLE 3

| Iron phthalocyanine | 6.05 | % by mass |
|---|---|---|
| Minatec 30 CM | 6.07 | % by mass |
| Mica | 2.99 | % by mass |
| Ca m-phosphate | 15.09 | % by mass |
| Zinc white | 6.05 | % by mass |
| Resin solution as in Example 1 | 47.82 | % by mass |

-continued

| Solvent | 14.36 | % by mass |
|---|---|---|
| Siccatives and auxiliaries | 1.57 | % by mass |

EXAMPLE 4

| Iron phthalocyanine | 5.68 | % by mass |
|---|---|---|
| Minatec 30 CM | 5.68 | % by mass |
| Mica | 2.82 | % by mass |
| Ca m-phosphate | 17.00 | % by mass |
| Zn tetraborate | 2.81 | % by mass |
| Resin solution as in Example 1 | 49.51 | % by mass |
| Solvent | 14.86 | % by mass |
| Siccatives and auxiliaries | 1.64 | % by mass |

EXAMPLE 5

| Iron phthalocyanine | 7.13 | % by mass |
|---|---|---|
| Minatec 30 CM | 7.14 | % by mass |
| Mica | 3.56 | % by mass |
| Ca m-phosphate | 14.26 | % by mass |
| Zinc phosphate | 7.10 | % by mass |
| Resin solution Plexigum PM 685 (acrylic resin in xylene) | 42.47 | % by mass |
| Solvent | 17.51 | % by mass |
| Siccatives and auxiliaries | 0.83 | % by mass |

COMPARISON EXAMPLE 1

| Zinc phosphate | 7.20 | % by mass |
|---|---|---|
| Zinc white (zinc oxide) | 11.63 | % by mass |
| Microtalc N | 6.19 | % by mass |
| Bayferrox 140 (red iron oxide) | 13.36 | % by mass |
| Blanc fixe | 6.19 | % by mass |
| Resin solution as in Example 1 | 41.64 | % by mass |
| Solvent | 12.5 | % by mass |
| Siccatives and auxiliaries | 1.29 | % by mass |

COMPARISON EXAMPLE 2

| Zinc yellow (zinc chromate) | 7.63 | % by mass |
|---|---|---|
| Zinc white | 11.63 | % by mass |
| Microtalc AT 1 | 6.19 | % by mass |
| Bayferrox 140 | 13.36 | % by mass |
| Blanc fixe | 6.19 | % by mass |
| Resin solution as in Example 1 | 41.21 | % by mass |
| Solvent | 12.5 | % by mass |
| Siccatives and auxiliaries | 1.29 | % by mass |

EXAMPLE 6

Coatings produced on an aluminum sheet and on a hot-galvanized steel substrate using a formulation in accordance with Embodiment Example 5 (two coats of a total thickness of 80 μm) exhibit no blistering or delamination phenomena after 12 months outdoor weathering according to DIN 53166 either in the vicinity of the slit or elsewhere on the surface of the samples. The quality of adhesion is demonstrated by testing using the pull-off method:

without exposure to water: 4 . . . 7 MPa after 9 d long-term immersion in distilled water: 5 . . . 12 MPa with fracture taking place predominantly not at the phase boundary between substrate and coating but instead within the coating (cohesive fracture). Coating materials containing the pigment preparations according to the invention are consequently suitable not only for application for ferrous materials but also, given the choice of a suitable binder, for other corroding metals for the purpose of effective protection against corrosion.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A pigment for anti-corrosion coating materials, comprising
   (i) 3–40% by weight of a monomeric or polymeric, metal-free or metal-containing chelate-forming compound of the formulae I or II

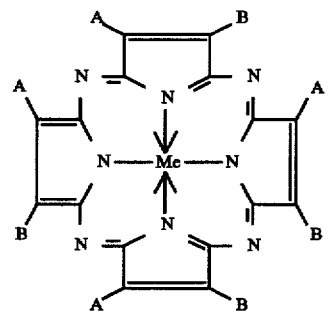

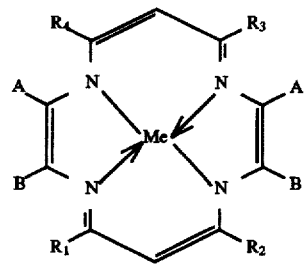

in which
   A and B are each independently of the other an aromatic or cycloaliphatic radical which may also contain heteroatoms in the ring, and aryl, alkyl, halogen, oxygen-, sulphur- or nitrogen-containing groups as additional substituents, or, for polymeric compounds, a multivalent aromatic, cycloaliphatic or alkyl linking group,
   $R^1$, $R^2 R^3$ and $R^4$ are independently H atoms or alkyl radicals and
   Me is Fe, Ni, Co, Mn, Bi, Sn, Zn or $H_2$,
   (ii) about 3–40% by weight of a material in flake form and
   (iii) about 25–80% by weight of a material which binds hydroxide ions.

2. A pigment according to claim 1, further comprising:
   (iv) 5–65% by weight of a conductive pigment.

3. A pigment according to claim 1, wherein the chelate-forming compound is a phthalocyanine.

4. A pigment according to claim 3, wherein the phthalocyanine is a metal phthalocyanine.

5. A pigment according to claim 4, wherein the metal phthalocyanine is an iron phthalocyanine.

6. A pigment according to claim 1, wherein the material in flake form is a phyllosilicate, glass or silicon dioxide material.

7. A pigment according to claim 1, wherein the material in flake form is natural or synthetic mica.

8. A pigment according to claim 1, wherein the material which binds hydroxide ions is a metaphosphate, di- or triphosphate.

9. The pigment of claim 1, wherein the chelate-forming compound is provided in an amount of 15–25% by weight.

10. An anti-corrosion coating composition comprising a pigment according to claim 1, and a binder.

11. The coating composition of claim 10, which further comprises zinc phosphate.

12. The pigment of claim 1, wherein A and B are each independently a carboxylic aromatic or cycloaliphatic radical of 3–10 carbon atoms, optionally containing 1 to 3 ring S, Se O and/or N heteroatoms in non-adjacent positions, and optionally substituted by 1 to 3 aryl groups of 6 to 10 carbon atoms, alkyl groups of 1 to 20 carbon atoms, halogens, hydroxy groups, alkoxy groups, thiol groups, thioether groups, amino groups or nitro groups.

13. The pigment of claim 1, wherein $R^1$, $R^2$, $R^3$ and $R^4$ are independently hydrogen or alkyl of 1–20 carbon atoms.

14. The pigment of claim 1, wherein the heteroatoms in A or B are S, Se, O or N.

15. A metal substrate coated with a film formed from a composition containing the pigment of claim 1.

16. The metal substrate coated with a film of claim 15, wherein the metal substrate is of a ferrous material.

17. The pigment of claim 1, wherein the material which binds hydroxide ions is a metaphosphate, diphosphate, triphosphate, silica gel, silicate, aluminosilicate, calcite or calcium silicate.

* * * * *